(12) United States Patent
Maeder et al.

(10) Patent No.: US 6,181,980 B1
(45) Date of Patent: Jan. 30, 2001

(54) METHOD AND SYSTEM FOR CONTROLLING CONVEYANCE AND PROCESSING OF PIECE GOODS

(75) Inventors: Carl C. Maeder, Hinwil; Bruno Lutz, Gruet, both of (CH)

(73) Assignee: Ferag AG, Hinwil (CH)

( * ) Notice: Under 35 U.S.C. 154(b), the term of this patent shall be extended for 0 days.

(21) Appl. No.: 09/318,553

(22) Filed: May 27, 1999

(30) Foreign Application Priority Data

May 27, 1998 (CH) .................................................. 1165/98

(51) Int. Cl.$^7$ ....................................................... G05F 7/00
(52) U.S. Cl. ........................................... 700/229; 700/230
(58) Field of Search ..................................... 700/229, 230, 700/228, 225; 198/572, 464.1, 464.4, 958

(56) References Cited

U.S. PATENT DOCUMENTS

| 3,743,090 | * | 7/1973 | Brown et al. | ........................... 198/38 |
| 4,707,250 | | 11/1987 | Hippenmeyer | ........................ 209/548 |

FOREIGN PATENT DOCUMENTS 0 153 201   8/1985  (EP) .
1 380 626  10/1964  (FR) .
2 070 744   9/1971  (FR) .

* cited by examiner

Primary Examiner—Christopher P. Ellis
Assistant Examiner—Khoi H. Tran
(74) Attorney, Agent, or Firm—Rankin, Hill, Porter & Clark LLP

(57) ABSTRACT

A system for conveyance and processing of large numbers of identical or at least similar objects (piece goods) has a large number of holders (22) which are movable in sequence along a conveying path (F) which is closed on itself. The holders convey held objects along the conveying path. In stations (30, 31) along the path, actions directed to objects or holders (22) are triggered. For controlling these actions, a selected number of the holders are equipped as signaling holders (23) such that between each two successive signaling holders (23), there is a different number of non-signaling holders. The stations (30, 31) have sensor means (33) for detecting signaling holders (23) as well as a counter (35/41) and a memory (36) for storing the counter reading. In response to a signal (S) generated on detection of a signaling holder (23), the memory contents are overwritten with the current counter reading and the counter is reset to zero. The counter (35, 41) counts time cycles (T) generated by a clock (34) or holders (22) detected by a suitable detector (40). The memory content and the counter reading together clearly identify a specific holder being conveyed through a station. The signals (S) can, in addition, be used for synchronizing a station cycle (T) and a local conveying cycle.

11 Claims, 1 Drawing Sheet

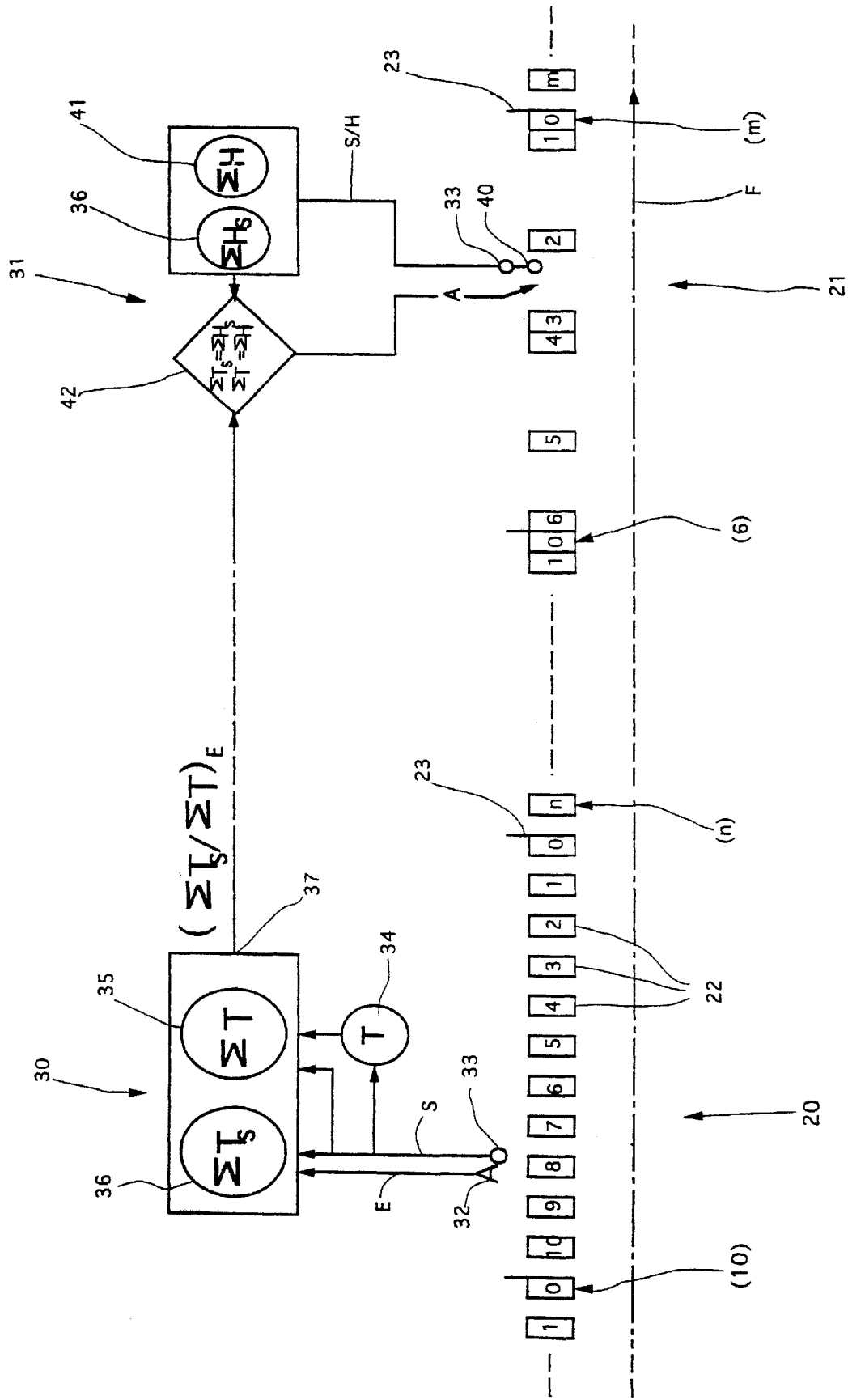

METHOD AND SYSTEM FOR CONTROLLING CONVEYANCE AND PROCESSING OF PIECE GOODS

FIELD OF THE INVENTION

This invention is in the field of piece good conveying and concerns a method and an arrangement for controlling conveyance and processing of piece goods.

BACKGROUND OF THE INVENTION

The term "piece goods" is a term of art which refers to a large quantity of identical or at least similar objects which are conveyed and processed in succession while being held individually or in groups. For conveying piece goods as defined above, it is usual to use conveying systems which are closed systems, i.e., conveying systems in which holding means, each holding and conveying one object or one group of objects are moved in a predetermined direction along a conveying path which is closed in itself. On this conveying path, at least one supply station and at least one removal station are provided, and in those stations objects are supplied to holding means or are removed from holding means, respectively. Between the supply station and the removal station, the conveyed holding means are loaded and their load may also be processed. Between the removal station and the supply station, the holding means are empty.

The holding means are, e.g., attached to an endless conveying chain at regular distances from each other, whereby the conveying chain runs in a chain channel and is driven by a suitable drive. However, the holding means can also be loosely connected with each other, i.e., without fixed distances between each other, or they can be individually movable along a rail system which is closed in itself without being mutually connected.

In stations through which or past which objects being held by holding means or empty holding means are conveyed, objects or holding means are acted on, e.g., supply or removal actions, handing-over actions, repositioning actions, processing actions or sensor actions for detecting characteristics of objects or of holding means. These actions are at least partly triggered by active control, either for each object or holding means being conveyed to the station, or for only a specific selection of the supplied objects or holding means, respectively. Control of such actions and synchronization of such actions with the conveying are important control functions in a system in which piece goods are conveyed and processed.

Specific problems concerning the control of conveying and processing of piece goods have, according to the state of the art, led to specific solutions. Stations in systems with a conveying chain are, e.g., controlled by means of a system clock cycle and possibly a fine cycle. For specific actions concerning specific objects or holding means, the clock cycles are counted and relevant cycle numbers are calculated for different positions along the conveying path according to their distances from a reference position. The basic element of control in such a system is the system clock cycle being correlated with the conveying speed.

In systems with very long conveying chains, an overall clock cycle control is no longer accurate enough and is therefore often replaced by local clock cycles and/or by sensor detection of holding means.

For triggering specific actions for specific objects or holding means in systems with holding means which are loosely connected to each other, or with holding means which are fully independent of each other, it is also suggested to equip each holding means with an electronic memory means containing a code or even data regarding characteristics of the held object and to provide suitable reading means for reading the code or memory contents in order to identify the holding means or to directly trigger a specific action.

All known attempts at solving the given problem are designed for specific applications and are either connected with too much effort or are too restricted in their effect for more general application.

SUMMARY OF THE INVENTION

An object of the invention is to provide a method for controlling conveyance and processing of piece goods, which method involves simple control and requires implementing devices which are not costly such that the system is not restricted as to the lengths of conveying chains or the independence of the holding means nor regarding the free selection for positions of freely selected stations along the conveying path, whereby in the stations either each supplied object or holding means or only specific objects or holding means are acted on. Additionally, when using the inventive method, costs and effort for commissioning, for cold starts, for statistical monitoring of the condition of holding means and for maintenance by replacing holding means is minimal. Furthermore, it is an object of the invention to create an apparatus for carrying out the inventive method.

Of the totality of holding means movable on a conveying path of a system in accordance with the invention, a plurality of holding means are equipped for a signaling function. Each station comprises sensor means for generating a signal when a signaling holding means is conveyed through it. Furthermore, the stations comprise internal clocking means or sensor means for recognition of holding means as well as counters for counting the time cycles clocked by the clocking means or for counting detected holding means.

A signal generated in a station when a signaling holding means passes through sets back the counter of the station and possibly causes registration or setting back to zero any momentary phase displacement between the station clock and the system or conveying clock. Between each two signaling holding means, a number of non-signaling holding means is provided, which number is to be different for each pair of successive signaling holding means. The number of holding means between a first downstream signaling holding means and a second upstream signaling holding means, which number is counted as a number of station cycles or as number of detected holding means and is stored or registered, clearly identifies the second signaling holding means (identification of signaling holding means). A current counter reading and the identification of the last passing signaling holding means clearly identify each holding means being conveyed through the reference point of a station.

For triggering actions regarding specific objects or holding means, the identification of the specific holding means is transmitted to the station. Such identification consists of set values for a current counter reading and a counter reading stored before the last counter reset. The identification is then compared in the station with the current counter reading and with the last stored counter reading until they coincide with the two transmitted set values when the action is triggered.

In stations comprising a plurality of actors spaced from each other or in stations with counter sensing and actors spaced from each other, the transmitted identification is corrected correspondingly.

As already mentioned above, the signal generated in a station when a signaling holding means is conveyed through it can also be used for storing a phase displacement between the station clock cycle and the conveying clock cycle. For this purpose, the moment of the signal is detected and stored with the help of a fine cycle partitioning of the station cycle, or the station cycle is synchronized with the signal by, for example, setting the phase displacement to zero. Such storing or resetting of a phase displacement serves for precise adjustment of action triggering to irregularities of conveyance which is especially necessary for purely cycle-controlled actions in far apart stations.

In the following it will be shown that with the method as briefly described above, all objects can be achieved in the simplest manner. As seen already from the principle of the inventive method as sketched above, clock synchronization between actions and conveying as well as identification of holding means are effected with the same means, i.e., with the help of signals generated by detecting signaling holding means and with the help of current and stored counter readings. This makes the method simple in principle.

BRIEF DESCRIPTION OF THE DRAWING

The inventive method and system will be described in more detail with reference to the accompanying drawing which is a schematic time diagram of the actions and functions of a system in accordance with the invention.

DESCRIPTION OF THE PREFERRED EMBODIMENT

The figure shows a diagram of parts of an example of an embodiment of a system for carrying out the inventive method with two regions 20 and 21 of a conveying path which is closed on itself and is shown as a broken, directed line F. Holding means 22 which are movable in the indicated direction along the conveying path F are shown as rectangles and have identical distances between each other in region 20 and varying distances in region 21. This will be recognized as a system in which the holding means are at least restrictedly independent from each other and wherein, in region 20, the holding means are driven by a conveying means (e.g., a cam chain) maintaining uniform distances between adjacent holding means. In region 21, the holding means are, e.g., driven by a drive to which they are coupled having essentially random spacing from each other (e.g. a driving chain). The objects held by holding means 22 are not shown.

Of the shown holding means 22, two in each region are equipped for a signaling function with, e.g., an additional mechanical member 23. In addition, all holding means 22 are denominated with rising numbers starting from the downstream signaling holding means, the numbers representing the corresponding counter readings when the holding means pass a reference position. Each signaling holding means is, in addition, denominated by the number of holding means in the group of holding means between a signaling holding means and the next signaling holding means further downstream (identification of signaling holding means in brackets) Furthermore, in both regions 20 and 21, one station 30 and 31 is shown forming a functional unit. In these stations, objects or holding means 22 are acted on in an appropriately triggered manner.

Station 30 is a station in which, e.g., using sensor means 32 specific conditions E (e.g. faulty objects or other specific characteristics of objects) are detected and are correlated with the identification of the corresponding holding means. For this purpose, station 30 additionally comprises means 33 for detecting signaling holding means and for generating corresponding signals S, a clock means 34, a time cycle counter 35 with a current counter reading $\Sigma T$ and a memory 36 for storing the counter reading $\Sigma T_S$ before counter reset. Signal S causes overwriting of memory 36 with the current counter reading, resetting the counter to zero and possibly causing synchronization between conveyance and clocking means 34 (resetting or storage of phase displacement). Clock means 34 initiates sensor means 32 at regular intervals and increases the counter reading by one in each time cycle.

In the moment shown in the figure, the memory content is $\Sigma T_S=n$ which is the number of non-signaling holding means between the signaling holding means (n) and a preceding signaling holding means (not shown) and the current counter reading has just been raised to 8. The next signal S will set the memory content $\Sigma T_S$ to 10.

When an event E is stored by the sensor means, a set of identification data $(\Sigma T_S/\Sigma T)_E$ is formed, which set consists of the current contents of memory 36 (identification of signaling holding means) and of the current counter reading $\Sigma T_E$. This data set is transmitted by output 37 to stations further downstream, e.g., to station 31, possibly together with data concerning the detected event or characteristics detected of the object or holding means correlated with the set of identification data.

Station 31 is, e.g., a station in which specific objects or holding means are acted on (e.g., holding means carrying faulty objects are made to drop these objects). The station is arranged in region 21 in which holding means 22 are conveyed with varying distances from each other. The station comprises, apart from means for detecting signaling holding means 33 and for generating corresponding signals S, means 40 for detecting holding means and for generating corresponding signals H. The station further comprises a signal counter 41 and, like station 30, a memory 36 for storing the counter reading before reset. Counter 41 is raised by one in response to each signal H. A signal S causes overwriting of memory 36 with the current counter reading $\Sigma H_S$ and resetting of counter 41 to zero.

Station 31 further comprises a comparing unit 42 in which the memory content $\Sigma H_S$ and the current counter reading $\Sigma H$ of the station is compared with sets of identification data, e.g., $(\Sigma T_S/\Sigma T)_E$ transmitted from stations further upstream, e.g. station 30. On coincidence of the data, e.g., action A or a specific action of a selection of different actions is triggered, the specific action being correlated with the characteristics data transmitted together with the identification data.

Station 31 may also be a removal station, i.e., a station in which objects are removed from holding means and are possibly transferred to holding means of a further system of the same type. In that case, the station comprises means for detecting signaling holding means also for the second system as well as means for counting time cycles or holding means and a memory for storing counter readings. Sets of identification data of the first system are correlated in this station with sets of identification data of the second system and event data or characteristics data are transmitted from this station to stations in the second system, together with the new identification data.

The figure shows different features of the inventive arrangement in a system example by which, however, the invention is not to be limited. It is possible that the holding means in the region of all stations are conveyed at identical distances from each other (e.g., a system with an endless conveying chain) or with variable distances in all stations. Furthermore, it is possible to operate a station with action triggering in the manner of station 30 (clock control) and vice versa it is possible to operate a station for event detection with means for detecting holding means instead of clock means. Furthermore, it is also possible to provide a plurality of actors (for detecting events and/or for acting in response to triggering) in the same station for which actors' relevant current counter readings are to be corrected according to their distances from means 33 for detecting signaling holding means and/or means 40 for detecting holding means before comparing them with sets of identification data.

The sets of identification data need not necessarily be generated by a station such as station 30 and transmitted to further stations, but can alternatively be generated in a central controlling unit responding to data generated outside of the system and be transmitted to the stations from there.

Stations may, e.g., comprise light barriers as means for detecting signaling holding means, which light barriers are interrupted by an additional mechanical part 23 distinguishing the signaling holding means as shown in the figure. A similar arrangement can also be provided for the means for general detection of holding means. Also conceivable are detection means with a laser source and a reflection sensor, wherein the laser beam of the laser source is reflected by a reflector distinguishing the signaling holding means into the reflection sensor and a signal is generated accordingly.

From the figure, it can be seen that the inventive method is applicable in substantially the same manner for holding means conveyed at fixed and identical distances from each other, for holding means conveyed at any variable distances from each other and also for systems in which the named conveying manners are applied regionally. From the function of the stations of the inventive arrangement it can further be seen that the point on the conveying path where the stations are positioned has no influence on the method. When commissioning, no system configuration regarding the conveying path positions of the stations is necessary. Only the distances between the different actors and sensor means inside of cycle controlled stations need be set in the software controlling the station.

The figure only shows functions of the stations which are relevant to the inventive method. The stations can further comprise almost any freely selectable functions.

On commissioning an inventive arrangement neither configuration of identifications for signaling holding means nor teaching of such identifications in a zero run are necessary. It is sufficient to convey two signaling holding means through stations generating sets of identification data for all following holding means to be clearly identifiable. The same is valid for a cold start, i.e., for a start after an at least partial loss of counter readings and memory contents or with invalid counter readings and memory contents.

In a system controlled according to the inventive method, the holding means can be subjected to a control measurement in each passage through a monitoring station and measurement data can be evaluated for statistical monitoring of the condition of the holding means. The measurement data or statistical control data calculated from it is simply stored with the corresponding set of identification data, whereby the identification data are stored in the same manner as in other stations.

If, during a revision of the system, holding means are to be replaced, it is not relevant whether the new holding means are introduced in the location of the removed ones or in a different location. It must only be seen to that no two numbers of holding means between two signaling holding means are made equal or that such equal numbers are at least at a considerable distance from each other. Because on replacing holding means in first positions by new holding means in second positions the correlation between holding means and counter readings in the sectors concerned (group of holding means between two specific signaling holding means) is changed, statistical condition monitoring for the relevant sectors must be started anew.

What is claimed is:

1. A method for controlling conveyance and processing of a large number of identical or at least similar objects wherein single objects or groups of objects are each held and conveyed by one holding means (22) of a large number of holding means (22) movable on a conveying path (F) closed on itself and whereby the objects are conveyed through or past stations (30, 31) in which actions directed to objects or holding means are triggered, the method comprising the steps of providing a plurality of holding means among the large number of holding means (22) with signaling devices as signaling holding means (22/23) such that between each two signaling holding means (22/23) there is a unique number of non-signaling holding means, providing a memory at each station for storing a count of holding means detected at the station, detecting at each station (30, 31) the presence of a signaling holding means (22/23), and generating a signal (S) in response to the detection of a signaling holding means, over-writing in response to a signal (S), a memory (36) with a current reading ($\Sigma T$, $\Sigma H$) of a counter (35, 41) and resetting the counter reading ($\Sigma T$, $\Sigma H$) to zero, for triggering actions (A) directed to objects or holding means (22), generating sets of identification data (($\Sigma T_S$/$\Sigma T)_E$) including specific memory contents and specific counter readings and transmitting the sets to at least another station (31), and comparing the sets of identification data to current memory contents ($\Sigma T_S$, $\Sigma H_S$) and current counter readings at said at least another station ($\Sigma T$, $\Sigma H$).

2. A method according to claim 1 wherein the counter (35, 41) counts time cycles (T) generated by a clock means (34) or counts signals (H) generated on sensor detection of holding means (22).

3. A method according to claim 1 wherein the sets of identification data (($\Sigma T_S$/$\Sigma T)_E$) are generated in at least one of the stations (30) and are transmitted to said at least another station (31) located further downstream.

4. A method according to claim 3 including determining or resetting in accordance with the generated signals (S) a phase displacement between a station clock and a local conveying clock.

5. A method according to claim 4 including, in at least one monitoring station, storing, statistically evaluating and storing characteristics of the holding means (22) together with sets of identification data ($\Sigma T_S$/$\Sigma T$) for each holding means (22).

6. A system for controlling conveyance and processing of piece goods comprising a large number of holding means (22) movable in sequence along a conveying path (F) and holding objects to be processed, said path being closed on itself;

stations (30, 31) along said conveying path (F) in which actions (A) directed to said objects held by said holding means (22) or to holding means are triggered;

a plurality of the large number of holding 25 means (22) being equipped as signaling holding means (22/23) such that between each two signaling holding means (22/23) there is a different number of non-signaling holding means, said stations (30, 31) comprising means for detecting the signaling holding means (22/23) and means for generating signals (S) in response to detection of a signaling holding means, and a counter (35, 41) and an overwriteable memory (36) for storing counter readings ($\Sigma T$, $\Sigma H$); and at least one part of the stations (31) comprise means for receiving sets of identification data (($\Sigma T_S/\Sigma T)_E$) and means (42) for comparing received sets of identification data with current contents of the over writeable memory (36) and with current counter reading.

7. A system according to claim 6 wherein said stations (30, 31) comprise clocking means (34) or means (40) for detecting holding means and that the counter (35, 41) is functionally coupled to the clocking means or to the means (40) for detecting holding means such that it counts time cycles or detected holding means.

8. A system according to claim 6 wherein at least part of the stations (30) comprise means for generating sets of identification data (($\Sigma T_S/\Sigma T)_E$) and means for transmitting sets of identification data (($\Sigma T_S/\Sigma T)_E$) to other stations (31).

9. A system according to claim 8 wherein at least one station (30, 31) is a monitoring station in which measuring data of holding means is stored and correlated with sets of identification data.

10. A system according to claim 6 wherein said holding means (22) are mounted on an driven endless chain uniformly spaced from each other.

11. A system according to one claims 6 wherein said holding means (22) are movable individually or loosely connected to each other on a rail system which is closed on itself.

* * * * *